United States Patent [19]

Roberts

[11] 4,454,040
[45] Jun. 12, 1984

[54] FILTER

[76] Inventor: Robert L. Roberts, 409 Concord Rd., Boothwyn, Pa. 19061

[21] Appl. No.: 430,883

[22] Filed: Sep. 30, 1982

[51] Int. Cl.³ .............................................. B01D 23/10
[52] U.S. Cl. ................................................... 210/283
[58] Field of Search ................. 210/283, 290, 291, 285

[56] References Cited

U.S. PATENT DOCUMENTS

| 468,984 | 2/1892 | Boeing | 210/283 |
| 4,208,281 | 6/1980 | Haberer et al. | 210/679 |

Primary Examiner—Ivars C. Cintins
Attorney, Agent, or Firm—Caesar, Rivise, Bernstein & Cohen, Ltd.

[57] ABSTRACT

An upflow filter of the type in which a liquid influent (e.g. water) is directed upwardly through buoyant filter media particles includes a porous supporting member, preferably in the form of a screen having openings through it that are larger than the nominal size of the media particles. A layer of particulate material is positioned on the upper surface of the porous supporting member and has a nominal particle size that is greater than the size of the openings through the supporting member. This layer of particulate material includes a plurality of interstices, or passages through which filtered liquid influent can pass, and, in the most preferred embodiment, also retains the buoyant media particles in the filter.

7 Claims, 3 Drawing Figures

U.S. Patent    Jun. 12, 1984    4,454,040
FIG. 3
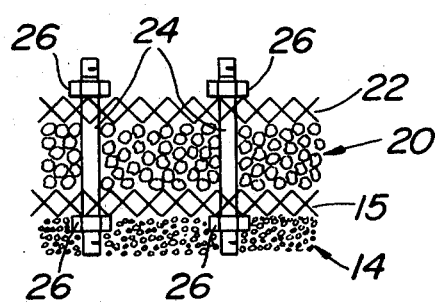
FIG. 2
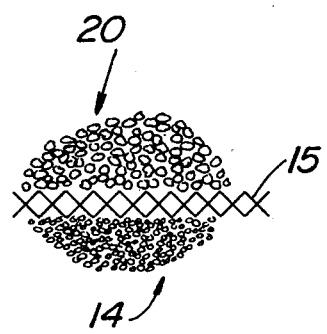
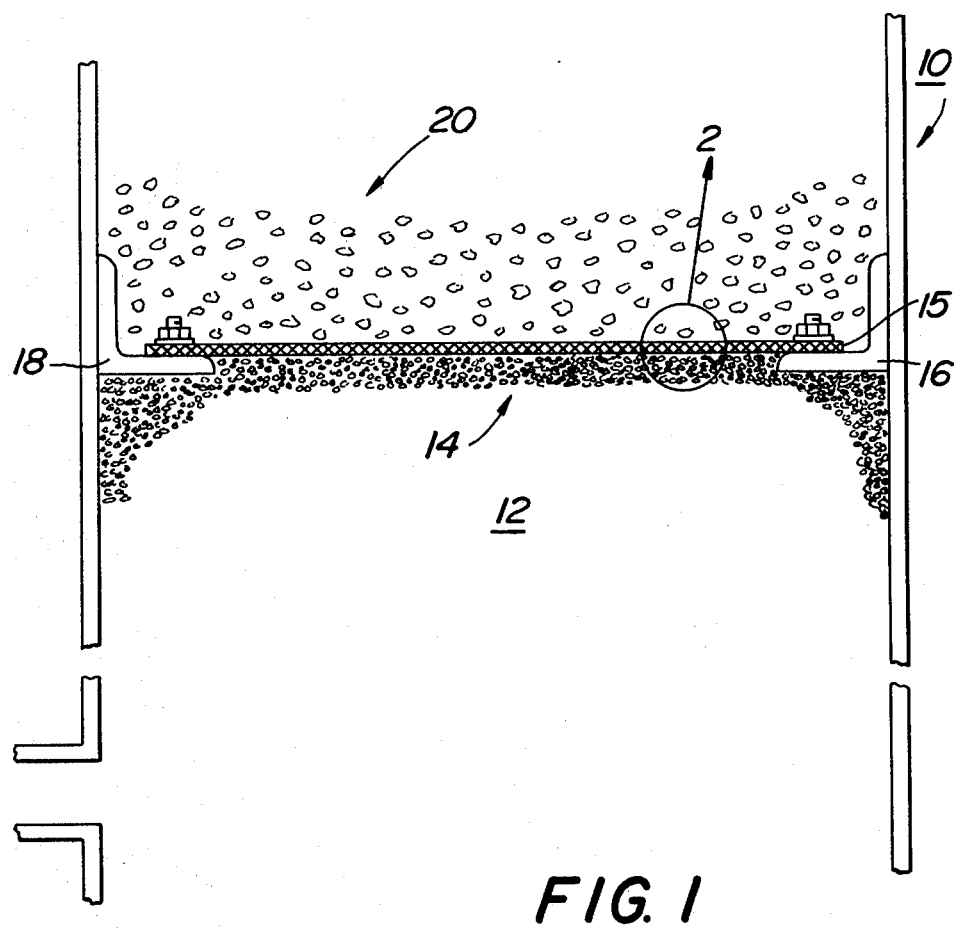
FIG. 1

FILTER

FIELD OF THE INVENTION

This invention relates generally to a liquid filter, and more specifically to an adsorption filter, or clarifier adapted for use in the treatment of water, and wasterwater.

BACKGROUND ART

It has been suggested to employ active adsorbent materials, such as activated carbon and aluminum oxide, to adsorb impurities in the filtration of water. One such system is disclosed in U.S. Pat. No. 4,208,281, issued to Haberer et al, and herein incorporated by reference.

In the Haberer et al system buoyant plastic particles, constituting the media of the filter, are coated with the active powder material prior to directing the influent to be treated upwardly through the system. This type of filter, wherein the influent is directed in an upward direction through the media, is referred to as an upflow filter. In order to maintain the buoyant media in proper position within the filter a fine mesh screen, having openings significantly smaller than the nominal size of the buoyant media, has been fixed above the media layer. Although this arrangement will successfully retain the buoyant media in the filter, the openings in the screen, due to their required small size for retaining the media, tend to become clogged very fast, both by buoyant media particles pressing against the surface of the screen and by contaminants (e.g. coagulated solids) in the influent. When the screen does become excessively clogged, it is necessary to physically detach it from the filter for either cleaning or replacement. Moreover, due to the smallness of the openings through the screen, such excessive clogging of the screen will tend to occur more frequently than is desirable for efficient filter operation.

Neptune Microfloc also employs buoyant particles (specific gravity < 1) in the adsorption media of an upflow clarifier forming part of a combination adsorption-gravity filter system presently being advertised under the trademark Trident. The clarifier is operated in an upflow mode, with the influent being directed upwardly through the buoyant media. Like the Haberer et al system, the Trident system requires the use of a retainer above the buoyant media. If a fine mesh screen is employed for this purpose, the same problems described above in connection with the Haberer et al system also will be encountered in the Trident system.

It also should be noted that, in the Haberer et al system, the flushing, or backwashing operation takes place by directing liquid wash water downwardly through the buoyant media, whereas in the Trident system the flushing or backwash cycle takes place by directing air and water upwardly through the buoyant media. If the backwashing water is dirty or impure (i.e. containing suspended solids in it), the backwashing operation in both systems can further clog the buoyant media-retaining screen. Moreover, due to the upward direction of the backwashing cycle in the Trident system, solids removed from the buoyant media may likewise be directed into the screen to clog it.

DISCLOSURE OF INVENTION

This invention relates to an upflow filter of the type in which a liquid influent is directed upwardly through buoyant filter media particles, characterized in that a porous supporting member including openings sufficiently large so as not to become excessively clogged by the buoyant media particles or coagulated solids in the influent, preferably larger than the nominal size of the media particles, is positioned above the media particles, and particulate material having a nominal size greater than the openings in the supporting member is positioned on, and is supported by the supporting member for retaining the buoyant filter media particles in the filter while, at the same time, providing a plurality of spaces or interstices through which liquid can flow during the filtering operation.

"Nominal particle size" or "nominal size", in referring to the dimensions of the media particles and other particulate material means the approximate size of the particles as determined by sieve analysis (e.g. U.S. or Tyler sieves). When referring to the small media particles, the "nominal particle size" is synonymous with the "effective particle size".

In the preferred system of this invention the particulate material positioned above the screen is gravel and is employed to prevent the escape of buoyant media particles from the system. The screen, due to the fact that its openings are larger than the nominal size of the buoyant filter media particles in the preferred embodiment of this invention, is not capable of providing this function. In other words, the screen actually constitutes a gravel support, not a media-retaining member; the particulate material retained on the screen actually constituting the media-retaining component of the system.

In the most preferred embodiment of the invention the buoyant media includes plastic particles, preferably formed of expanded, polymerized alkenes, such as polystyrene, and the particulate material supported on the supporting member, as indicated earlier, preferably is gravel. Most preferably, the screen openings are at least 150% larger than the nominal size of the buoyant media particles, but no greater than 90% of the nominal size of the gravel particles. Moreover, in the most preferred arrangement of this invention the nominal size of the gravel particles should be at least twice the nominal size of the buoyant media particles.

The present invention is adapted to be employed generally in filters, and most preferably in adsorption filters or clarifiers which either employ an upflow flushing cycle, such as is utilized in the earlier-described Trident system, or a gravity flow backwashing cycle, such as is utilized in the earlier-described Haberer et al process. It is entirely possible that when air is utilized in the flushing cycle, such as in the Trident system, it will tend to adversely disturb the arrangement of the particulate material layer positioned on the upper surface of the porous supporting member. To prevent this from happening the present invention contemplates the use of a second porous supporting member, in the form of a screen, retained adjacent to the upper surface of the layer of particulate material to assist in immobilizing the particles in it. In a preferred form of the invention the second porous supporting member is retained adjacent to the upper surface of the layer of particulate material by being interconnected, through the thickness of the layer, to the lower porous supporting member. This interconnection can be established in many different ways, such as by securing threaded bolts, with retaining nuts at the opposed ends thereof, between and through the screens. Alternatively, interconnecting wire can be passed through openings in both screens, and actually twisted around the strands defining the openings therein to retain the screens in proper position. The particular manner in which the screens are retained in proper position within the filter generally is a matter of design choice.

Other objects and advantages of this invention will become apparent by referring to the following description of the Best Mode of the Invention, taken in conjunction with the drawings.

BRIEF DESCRIPTION OF THE DRAWINGS

FIG. 1 is a somewhat schematic section view illustrating the unique arrangement of elements in a preferred embodiment of this invention;

FIG. 2 is an enlarged view of the circled section of FIG. 1 identified by the numeral "2"; and FIG. 3 is an enlarged, fragmentary view illustrating a modified form of the invention.

BEST MODE OF THE INVENTION

Referring to FIGS. 1 and 2, an upflow adsorption filter or clarifier 10 in accordance with this invention includes a lower section 12 in which buoyant media particles 14 are contained. Most preferably, the buoyant media is formed of plastic particles of the type disclosed in earlier-referenced U.S. Pat. No. 4,208,281, issued to Haberer et al; having a nominal or effective particle size of 1-2 millimeters.

In accordance with this invention the buoyant media particles 14 initially can be coated with an active material, such as activated carbon, as is disclosed in the above-referenced Haberer et al patent. Alternatively, the buoyant media particles may be employed in systems where the active material is introduced directly into the influent prior to passing the influent through the filter media, and also possibly in systems where active material is not used at all.

Still referring to FIGS. 1 and 2, a porous supporting member 15, in the form of a screen, is retained in overlying relationship with the buoyant particles 14 by being bolted directly to flanges 16 and 18 adhered to sidewalls of the filter. Unlike the prior art arrangements, the openings in the screen 15, in the most preferred embodiment of the invention, are larger than the nominal size of the buoyant media particles 14; preferably by at least 150% (FIG. 2).

The screen 15 functions to support particulate material 20 thereon. This particulate material preferably is gravel; preferably either in the form of a single course or graded layer. In either event the gravel particles adjacent to, and supported by the screen 15 have a nominal size greater than the size of the screen openings to permit the screen to provide its gravel-supporting function. Gravel having a nominal size of 3/16 inch by 1/10 inch, as defined by American Water Works Association (AWWA) Standard B 100-72, can be used in this invention. Most preferably, the size of the openings in the screen is no greater than 90% of the nominal size of the particles supported thereon.

In the most preferred embodiment of this invention the particulate material 20 actually acts as the upper support, or retaining means for the underlying buoyant media 14; the screen 15 functioning solely as a gravel support. In fact, since the size of the openings in the screen is larger than the nominal size of the buoyant media particles 14, the screen is not actually capable of functioning as an effective media-retaining member. Most preferably, the nominal size of the gravel particles is at least twice the nominal size of the buoyant media particles to thereby provide a sufficient difference in particle size to insure that all elements remain in proper position to provided their intended function.

In accordance with this invention the layer of gravel 20 should be of a sufficient depth to prevent the buoyant media particles from passing through it, and thereafter escaping from the filter; even if slight lateral migration of the gravel in the layer should take place during the filtering operation. A depth of at least about 6 inches is believed to be suitable for this purpose.

The use of the layer of gravel 20 to retain the buoyant media in the filter has several distinct advantages over the prior art systems, wherein only a fine mesh porous screen is employed for this purpose. First, the gravel layer inherently includes a significant number of interstices, or passages through it for permitting the upflow filtering operation to be carried out for a significant length of time before excessive clogging of the passages takes place. In view of the fact that the openings through the screen are significantly larger than have been employed in the prior art devices, they do not tend to become clogged during operation of the system. Moreover, since the screen does not tend to become clogged, only the relatively inexpensive gravel needs to be removed and replaced in the system once the passages therein do become clogged. There is absolutely no need to carry out the more complicated step of removing the expensive supporting substructure; a requirement that does exist when a fine mesh screen is employed by itself to retain the buoyant media in the filter.

During certain types of operations, the layer of particulate material 20 supported on the screen 15 may tend to migrate, or shift excessively; thereby preventing it from providing its media-retaining function. For example, such a condition may exist during an air-water flushing cycle similar to that employed in the Trident system.

Referring to FIG. 3, a system for preventing excessive shifting of the particulate material 20 is disclosed. Specifically, this system is substantially identical to that described earlier, except that a second porous supporting member, in the form of a screen 22, is positioned in overlying relationship with the layer of particulate material 20, and is retained in this position through the cooperation of bolts 24 and threaded nuts 26. More specifically, the bolts 24 extend through openings in the opposed screens 15 and 22, and have threaded ends for receiving the threaded nuts 26. These nuts overlie the strands of the screens 15 and 22 to effectively tie the screens together, and thereby immobilize the particulate material 20 between them. In this embodiment of the invention the openings in the screen 22 preferably are smaller than the nominal size of the particulate material adjacent to it, and can be substantially the same size as the openings in screen 15.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but only by the scope of the claims appended hereto.

What is claimed is:

1. An upflow filter of the type in which influent is directed upwardly through buoyant filter media particles, characterized in that a porous supporting member including openings that are larger than the nominal size of the buoyant filter media particles is positioned above the media particles, and a layer of particulate material, having a nominal particle size greater than the openings through the supporting member, being supported on said member and including a plurality of interstices for permitting filtered influent to pass through it, said layer of particulate material retaining the buoyant filter media particles in the filter.

2. The upflow filter of claim 1, characterized in that the size of the openings in the supporting member is at least 150% larger than the nominal size of the buoyant media particles and is not greater than 90% of the nominal size of the particles in the layer of particulate material that is supported on the porous member.

3. The upflow filter of claim 2, characterized in that the nominal size of the particulate material above the supporting member is at least twice the nominal size of the buoyant media particles.

4. The upflow filter of claims 1, 2 or 3, characterized in that the buoyant media particles are plastic and the particulate material in the layer above the porous supporting member is gravel.

5. The upflow filter of claim 4, characterized in that a second porous supporting member is retained adjacent the upper surface of the layer of particulate material, said second supporting member having openings through it that are smaller than the nominal size of adjacent particles in the layer of particulate material.

6. The upflow filter of claims 1, characterized in that a second porous supporting member is retained adjacent the upper surface of the layer of particulate material, said second supporting member having openings through it that are smaller than the nominal size of adjacent particles in the layer of particulate material.

7. The upflow filter of claim 6, characterized by the addition of interconnecting means for interconnecting the second porous supporting member positioned above the layer of particulate material to the other porous supporting member supporting said layer of particulate material.

* * * * *